United States Patent [19]

Vengsarkar et al.

[11] Patent Number: 5,550,940
[45] Date of Patent: Aug. 27, 1996

[54] OPTICAL TAPPING FILTERS EMPLOYING LONG PERIOD GRATINGS

[75] Inventors: Ashish M. Vengsarkar, Morris County; Kenneth L. Walker, Union County, both of N.J.

[73] Assignee: Lucent Technologies Inc., Murray Hill, N.J.

[21] Appl. No.: 393,754

[22] Filed: Feb. 24, 1995

[51] Int. Cl.⁶ ............................................. G02B 6/34
[52] U.S. Cl. .............................. 385/28; 385/37; 385/50; 385/126
[58] Field of Search ........................ 385/28, 27, 37, 385/39, 30, 50, 126

[56] References Cited

U.S. PATENT DOCUMENTS 4,737,007  4/1988  Alferness et al. ............... 385/37 X
5,150,439  9/1992  Hill et al. .......................... 385/39

OTHER PUBLICATIONS

J. L. Archambault, et al. "Novel channel-dropping filter by grating-frustrated coupling in single-mode optical fiber", *OFC Technical Digest* p. 51 (1994). Feb.

*Primary Examiner*—John D. Lee
*Assistant Examiner*—Phan T. H. Palmer
*Attorney, Agent, or Firm*—Glen E. Books

[57] ABSTRACT

In accordance with the invention, an optical filter comprises a plurality of optical fibers having a coupling region where the axially extending cores are closely spaced within a common cladding. The coupling region includes a long period grating for selectively shifting light of selected wavelengths from guided modes into non-guided modes. These non-guided modes are picked up by an adjacent core and light of the selected wavelengths is thus shifted from one core to another. The result is an optical filter particularly useful as a demultiplexer or a tapping device. In one embodiment the grating is formed in one of the cores. In an alternative embodiment, it is formed in the common cladding.

6 Claims, 2 Drawing Sheets

OPTICAL TAPPING FILTERS EMPLOYING LONG PERIOD GRATINGS

FIELD OF THE INVENTION

This invention relates to optical communications devices and, in particular, to optical filters employing long period gratings.

BACKGROUND OF THE INVENTION

Optical fiber communications systems are becoming increasingly important in the high speed transmission of large amounts of information. A typical fiber communications systems comprises a source of optical input signals, a length of optical fiber coupled to the source, and a receiver for optical signals coupled to the fiber. In essence, an optical fiber is a small diameter waveguide characterized by a core with a first index of refraction surrounded by a cladding having a second (lower) index of refraction. Light rays which impinge upon the core at an angle less than a critical acceptance angle undergo total internal reflection within the fiber core. These rays are transmitted with minimum attenuation in guided modes along the axis of the fiber.

Optical filters are used for shaping the spectral features of transmitted optical pulses, and multiplexers are used for transmitting a multiplicity of different signals at different wavelengths. The present invention relates to devices which can be used as filters and as demultiplexers to separate multiplexed signals in optical communications systems.

SUMMARY OF THE INVENTION

In accordance with the invention, an optical filter comprises a plurality of optical fibers having a coupling region where the axially extending cores are closely spaced within a common cladding. The coupling region includes a long period grating for selectively shifting light of selected wavelengths from guided modes into non-guided modes. These non-guided modes arc picked up by an adjacent core and light of the selected wavelengths is thus shifted from one core to another. The result is an optical filter particularly useful as a demultiplexer or a tapping device. In one embodiment the grating is formed in one of the cores. In an alternative embodiment, it is formed in the common cladding.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

Figure 1:
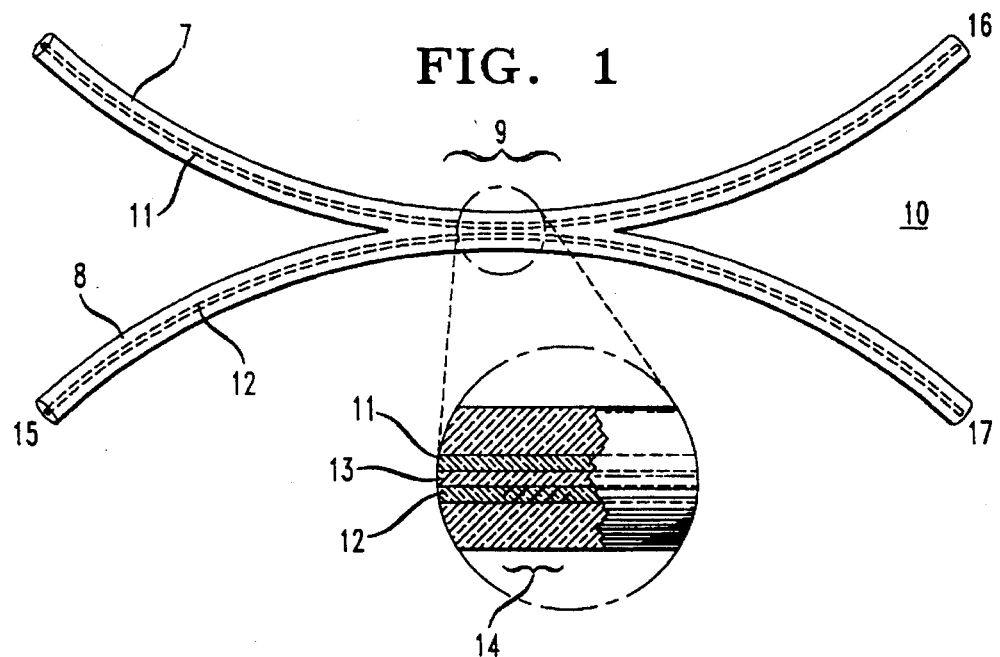
FIG. 1 is a schematic view of an optical filter in accordance with one embodiment of the invention.

Referring to the drawings, FIG. 1 is a schematic cross section of a first embodiment of an optical filtering device 10 comprising a plurality of optical fibers 7 and 8 joined along a coupling region 9. Within the coupling region, the axially extending waveguiding cores 11 and 12 are closely spaced within a common cladding 13. Preferred center-to-center spacing between the cores is less than 10 core diameters (or less than 10 mean core diameters if the cores have unequal diameters). One of the cores, here core 12, includes a long period grating 14 for selectively shifting light of selected wavelengths from guided modes into non-guided modes. Because of the coupling between the two cores, much of the light shifted from guided modes in core 12 is coupled to core 11 where it is absorbed into guided modes. Advantageously, the device is provided with at least three ports 15, 16 and 17. In typical operation, optical input pulses will enter the device via port 15 which has a core region continuous with grating core 12. One output can be taken from port 16 which is continuous with core 11 and another can be taken from port 17 which is continuous with core 12. While a two-core device is shown in FIG. 1, it will be appreciated that similar devices can be made employing three or more cores.

The long period grating 14 comprises a plurality of index perturbations of width w spaced apart by a periodic distance $\Lambda$ where, typically, $50 \, \mu m \leq \Lambda \leq 1500 \, \mu m$. Advantageously, $\frac{1}{5}\Lambda \leq w \leq \frac{4}{5}\Lambda$ and preferably $w = \frac{1}{2}\Lambda$. The perturbations are formed within the glass core of the fiber and preferably form an angle $\theta (2° \leq \theta \leq 90°)$ with the longitudinal axis of the fiber. The fiber is designed to transmit broad band light of wavelength centered about $\lambda_o$.

The spacing $\Lambda$ of the perturbations is chosen to shift transmitted light in the region of a selected wavelength $\lambda_p$ from the guided mode into a non-guided mode, thereby reducing in core 12 the intensity of light centered about $\lambda_p$. In contrast with conventional short period gratings which reflect light, these long period devices remove the light without reflection by converting it from a guided mode to a non-guided mode. A substantial portion of the non-guided light couples into core 11 where it excites guided modes, producing in 11 a narrow pulse of light centered about $\lambda_p$.

Figure 2:
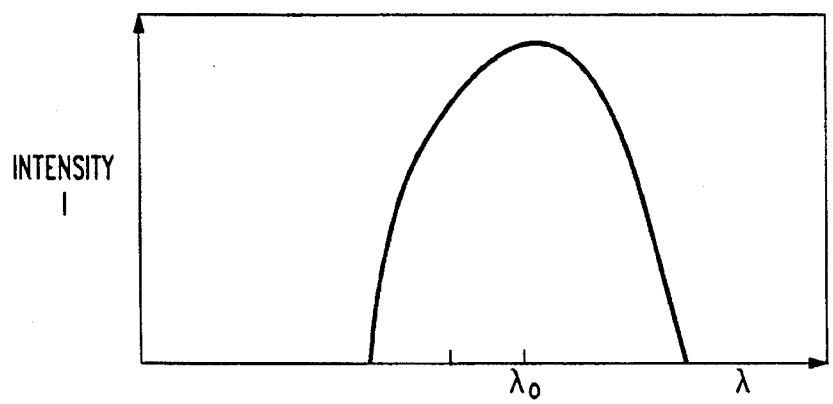
FIGS. 2, 3 and 4 are qualitative spectral diagrams of an optical pulse at various locations in the device of FIG. 1.
Figure 3:
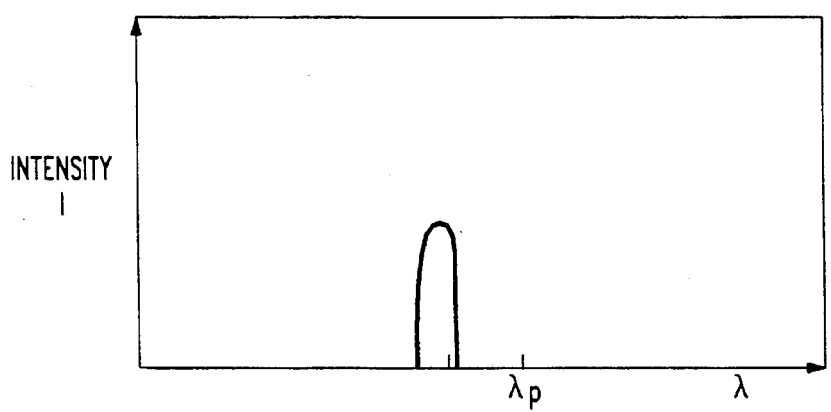
Figure 4:
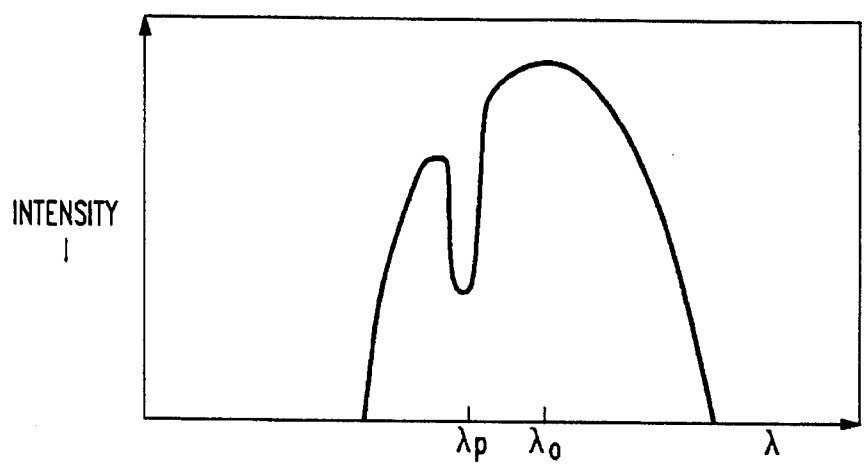

FIGS. 2, 3 and 4 illustrate the operation of the device. FIG. 2 shows the spectrum of a relative broad pulse of light centered about $\lambda_o$ entering core 12 via port 15. FIG. 3 shows the spectrum of the relatively narrow pulse of light centered about $\lambda_p$ which is coupled from core 12 to core 11 and exits via port 16. FIG. 4 shows the spectrum of the pulse on core 12 at port 17 after the light has passed through the long period grating 14. The pulse is diminished in a region near $\lambda_p$.

Figure 5:
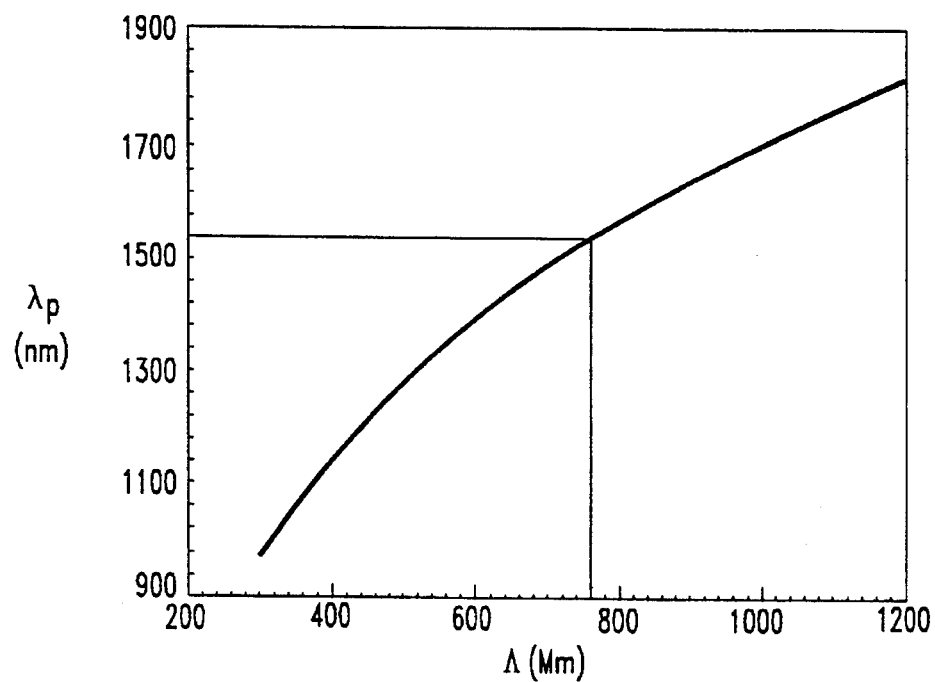
FIG. 5 is a graphical plot of center wavelength versus period useful in making the device of FIG. 1.

FIG. 5 is a graph useful in designing the long period grating 14. Specifically, FIG. 5 plots for a communications optical fiber with core $\Delta = 0.3\%$ and core diameter of 8 $\mu m$ the periodic spacing $\Lambda$ for shifting to an unguided mode, light centered about a wavelength $\lambda_p$. Thus, for example, to make a device for shifting light centered around 1540 nm, one chooses a spacing of about 760 $\mu m$. Similar curves can be empirically determined for other specific fibers.

Preferably the device is made by fusing together in the coupling region, two separate optical fibers. One fiber can have a core, such as germanosilicate glass, which is sensitive to UV radiation, and the other can have a core, such as aluminum or phosphorous doped silica, which is insensitive to UV radiation. The claddings can be fused, as by the application of heat, and UV sensitivity can be enhanced by diffusing $H_2$ or $D_2$ into the glass. Alternatively, a single fiber having a plurality of cores and a common cladding can be drawn from preform containing a corresponding plurality of core rods.

The long period grating can be written by exposing the fused region to UV radiation, e.g. 248 nm radiation from a KrF laser, through a slit or a mask. If a slit is used, the fiber is moved to successive exposure sites. The preferred exposure dosage for each slit is on the order of 1000 pulses of >100 mJ/cm² fluence/pulse, and the number of index perturbations is in the range 10–100.

Figure 6:
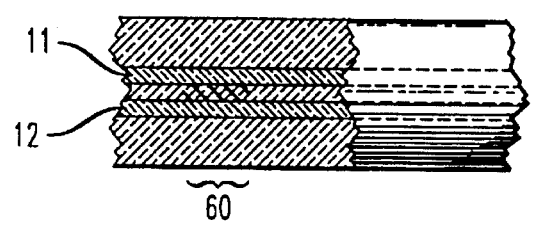
FIG. 6 is a second embodiment of a filter in accordance with the invention.

FIG. 6 illustrates the coupling region of an alternative embodiment of an optical filtering device similar to FIG. 1 wherein the long period grating 60 is formed in the cladding common to a plurality of cores rather than in one of the cores. With this arrangement, the cores are advantageously of different diameter or different index so that light at the mid-band $\lambda_p$ for the grating is preferentially coupled into one of the cores.

A convenient way to make the FIG. 6 device is to provide fibers with UV sensitive cladding (e.g. germanosilicate glass) and UV insensitive cores (e.g. aluminum or phosphorous doped silicates). The grating can be written as described above, but will form only in the UV sensitive cladding.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

We claim:

1. An optical filtering device comprising:

a plurality of optical waveguiding cores extending side-by-side in a common cladding, and a grating for shifting light in a guided mode in one of said cores to a non-guided mode, said grating comprising a plurality of index perturbations spaced apart by a periodic distance $\Lambda$, where $50\ \mu m \leq \Lambda \leq 1500\ \mu m$.

2. A device according to claim 1 wherein said grating is in one of said cores.

3. A device according to claim 1 wherein said grating is in said common cladding.

4. A device according to claim 1 wherein said cores are spaced apart by less than 10 mean core diameters.

5. A device according to claim 1 wherein said index perturbations have a width w, where $\frac{1}{5}\Lambda \leq w \leq \frac{4}{5}\Lambda$.

6. A device according to claim 1 wherein said pair of optical cores in a common cladding comprises a pair of optical fibers fused together.

* * * * *